Patented Feb. 15, 1927.

1,617,411

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

METHOD OF VULCANIZING RUBBER AND THE LIKE.

No Drawing. Application filed May 12, 1923. Serial No. 638,668.

My invention relates to the vulcanization of rubber and the like, and has for its object to provide an improved method of treating such substances as to effect a practically perfect vulcanization in a comparatively short time and at a low temperature.

In an application filed by me December 23, 1922, Serial No. 608,751, I have described a method whereby the sulphur, metallic oxide and an organic accelerator may be applied to the rubber in a novel manner, and my present invention is a modification of the disclosure therein contained.

More specifically, this invention consists in first preparing, by the usual milling and calendering methods, a sheet or piece of rubber, which may contain any desired fillers, colors and the like; then preparing a compound or mixture of metallic oxide, sulphur and an organic accelerator; and applying said compound or mixture to the surface of the sheet or piece of rubber by dusting or otherwise. The article so treated then may be subjected to the vulcanizing heat, and it has been found that the metallic oxide, sulphur and organic accelerator will migrate into the body of the rubber compound in such manner as to effect a thorough vulcanization under a comparatively low heat.

It will be understood that the rubber or rubber compound after milling may be preformed to any desired shape or size, that is to say, to the shape of the finished article, and the compound or mixture of metallic oxide, sulphur and organic accelerator then applied thereto for the subsequent vulcanizing step.

I have found that substantially the following proportions of metallic oxide, sulphur and organic accelerator successfully will accomplish the desired vulcanizing effect:—

| | Per cent of the rubber content. |
|---|---|
| Metallic oxide | 10 |
| Sulphur | 3 |
| Organic accelerator | 2 |

It will be understood, of course, that while the above proportions have been found suitable for accomplishing the desired result, still I do not wish to be understood as limiting myself thereto.

I have found in practice that a thoroughly efficient manner of carrying this method into effect is to prepare a mixture of the oxide, sulphur and accelerator in the form of a dry powder, with which may be mixed, if desired, any suitable proportion of powdered soapstone, cornstarch, or the like; but I do not wish to be understood as limiting myself to this form of application, as my invention is intended to embrace any manner of application of these ingredients to the rubber stock, whether in powdered, liquid or gaseous form.

Having thus described my invention what I claim as new and desire to obtain by Letters Patent, is:—

1. The method of vulcanizing rubber, which consists in applying to the surface of a sheet or piece of rubber a compound or mixture of metallic oxide, sulphur and an organic accelerator by dusting the same thereon, and then subjecting the same to a vulcanizing heat.

2. The process of producing a vulcanized rubber compound, which consists in forming a sheet of rubber compound, applying to the surface of the sheet a sprinkling of sulphur, an accelerator and a metallic salt which will increase the speed of action of the accelerator, and thereafter vulcanizing the sheet.

In testimony whereof I hereunto affix my signature.

THOMAS W. MILLER.